April 3, 1951  E. G. HUZENLAUB ET AL  2,547,393
VACUUM DRYING CYLINDERS, PARTICULARLY FOR GRAIN
Filed Aug. 29, 1945  2 Sheets-Sheet 2

Inventors
Erich Gustav Huzenlaub
Francis Heron Rogers
By Williams, Bradbury & Hinkle
Attorney Patented Apr. 3, 1951

2,547,393

UNITED STATES PATENT OFFICE 2,547,393

VACUUM DRYING CYLINDERS, PARTICULARLY FOR GRAIN

Erich Gustav Huzenlaub, Brentford, and Francis Heron Rogers, Kenley, England, assignors, by direct and mesne assignments, to Mars and Huzenlaub, Chicago, Ill., a copartnership Application August 29, 1945, Serial No. 613,238
In Great Britain April 25, 1945

5 Claims. (Cl. 34—92)

This invention relates to improvements in rotary drying cylinders of the vacuum type used for drying cereals including rice in batches in contradistinction to continuous drying. This type of dryer is generally steam heated, the grain under treatment obtaining heat transfer from the walls and tubes of the drying device during rotation. The object of the invention is to dry wet grain evenly and as quickly as possible without causing deleterious effects to the dried product and to enable filling, emptying, rotating and cleaning of the aforesaid drying cylinder to take place in the most effective manner.

Certain cereals such as rice, barley, wheat or the like that have been subjected to a conversion process to produce vitamin transfer from the germ, and other vitamin containing parts to the endosperm or starch of the grain, are subjected to a process of aqueous steeping or steaming whereby the moisture content of the cereal is raised from a moisture content at which the cereals have been harvested or stored to an abnormal content of about 30% to 40%, and after such water or steam treatment the grain must be dried down under exact conditions until a normal and suitable dry weight is attained or to a near figure such as about 12% to 15% in the case of rice and 14 to 18% in the case of wheat for flour making and about 12 to 18% in the case of other cereals to obtain the correct tempering of moisture and condition of the grain for milling. Further, climatic and soil conditions before and during harvesting and particularly also mechanical methods of harvesting sometimes have the effect of bringing in from the field cereals in a moist condition unsuitable for storing and milling. For example, cereals harvested with combines often have moisture contents as high as 20 to 25%, which moisture contents make the cereal totally unsuitable for storing and milling without preliminary dehydration to more suitable moisture content such as previously mentioned. Thus in a drying machine of the type set forth holding for instance 10 metric tons of normal dry weight of grain it is necessary in an extreme case, i. e., when the normal dry weight moisture was 11% and when this moisture was raised to 40% and when the wet cereal is to be dried to a moisture of—say —14% to evaporate a total water weight of 9950 lbs. whilst under more favourable conditions when the normal dry weight moisture was 18% then raised to 30% and then dried to say 16% a total water weight of 4264 lbs. requires to be extracted from the cereal and removed from the interior of the drying vessel. Whilst the degree of variation of moisture above set out is large the greater problem perforce must include the lesser, since the qualities of the grain and methods of treatment vary with the season, crop and locality of growth.

The grain in some cases may be steeped or subjected to steam condensation in the drying machine itself. If, however, it be water or steam treated in a separate vessel, the grain is introduced to the drying machine as soon as possible; thus cereals such as rice which have been subjected to a parboiling or steam treatment process are filled into the dryer with the retention of maximum heat possible so that when the content of the dryer vessel is subjected to vacuum, a volume of water vapour is produced, which must be removed with the least possible delay, and the grain is at all times subjected to a heat transfer from the steam jacketed walls of the vessel and from the walls of steam tubes inside the vessel. This maintains the product to be dried at such temperature that moisture under vacuum influence continues to be removable. It has been found that if some cereals and rice in particular are subjected to other forms of intense drying, such for example as hot air drying, the evaporation from the skin of the grain is excessive and the water content internal of the kernel cannot emerge with sufficient speed to keep a uniform degree of moisture within the grain body. Ring tailing or transverse cracking results due to contraction of the grain skin about a plastic body. With vacuum drying ideal conditions exist provided always that the residual latent heat removed in vapour production is restored. Since heat conduction in vacuum is negligible it is necessary to provide the maximum contact area for heat transfer to the drying grain. The designer of such drying plant is therefore faced with the problem of extraction of a very large volume of aqueous vapour at the start of evacuation, which if not quickly removed delays the drying operation, tends to promote derogatory change and generally is undesirable.

In all existing types of vacuum dryers for dehydrating wet grain, the vapours arising under heat and vacuum are removed normally by a centrally located vapour pipe. The exit to the vapour pipe is again normally at one side of the drying cylinder and the vapours therefore traverse a considerable interior of the drying cylinder and of the grain body mass before reaching the exit. There is a tendency in this type of dryer for the action of vapour release under vacuum to be reversible and partial condensation take place upon grain which is cooler than the temperature of the grain giving vapour release, i. e. that grain which has contacted with the steam pipes or the steam jacket. Theoretically there would appear, therefore, to be two counteracting phenomena in this type of vapour separation, and its cure is to locate the vapour pipes at such point in vapour traverse in the body of the grain, that the path from vapour source to exit is as short as possible, but equally evenly distributed over the cross sectional area of the dryer. Further, if the vacuum plant is efficient the exit vapour pipes must be large, as the escaping vapours have economic limits in velocity and there is a large volume of water to be abstracted when there is a large drop in pressure. Thus assuming the moisture of grain at 95° C. to be 34% of the total weight, the amount of water given off as vapour within say 10 or 15 minutes, due solely to the drop in pressure and without reference to any continued heating is 374 lbs., these figures being in relation to a vessel capable of holding, with tumbling capacity, 10 tons of grain having a normal dry weight of 12%.

Since, however, the grain in the above given example has reached in the prior step of steam treatment a temperature nearly that of boiling point, and steam is maintained in the cross pipes and the jacket during the whole of the period of drying, there is the additional quantity of vapour which is generated by the heat imparted to the moist grain during this same interval of time, whilst the vessel is rotating, and therefore constantly causing the damp grain to re-contact a heated surface, whose temperature is in the neighbourhood of 120° C.

Again, since the grain level in any such dryer leaves the vapour exit channels covered for 75% of their rotary travel it is necessary to provide such channels with copious area to extract vapour from an all embracing mass of moisture laden cereal and yet achieve this object with a low linear speed of vapour flow, or in any event less than that of grain entrainment so that the meshings of the vapour exit pipe remain clear of grain, which otherwise wedges within the interstices of the meshings employed.

The object of the present invention is to overcome the above difficulties and consists in an improved vacuum drying device for grain characterised that a rotary drying cylinder is steam jacketed and has a series of heating conduits arranged axially to provide a cruciform filling space in said cylinder, and of providing in some of said spaces, perforate gauze covered vapour exit pipes spaced away from the inner shell of said vessel and connected to a common suction header, the combined area of all vapour pipes being in excess of that of the header, whereby the speed of vapour travel within said pipes to the evacuation system is less than grain entrainment within the dryer.

The invention further comprises means for assembling the vapour collecting header within the cylinder, means for introducing the internal vapour extraction pipes and cleaning same, and of continuously evacuating condensed steam from the external jacket and headers as evacuation internal of the cylinder proceeds.

In order that the invention shall be better understood reference is made to the accompanying drawings wherein preferred embodiment is shewn and wherein—

Figure 1:
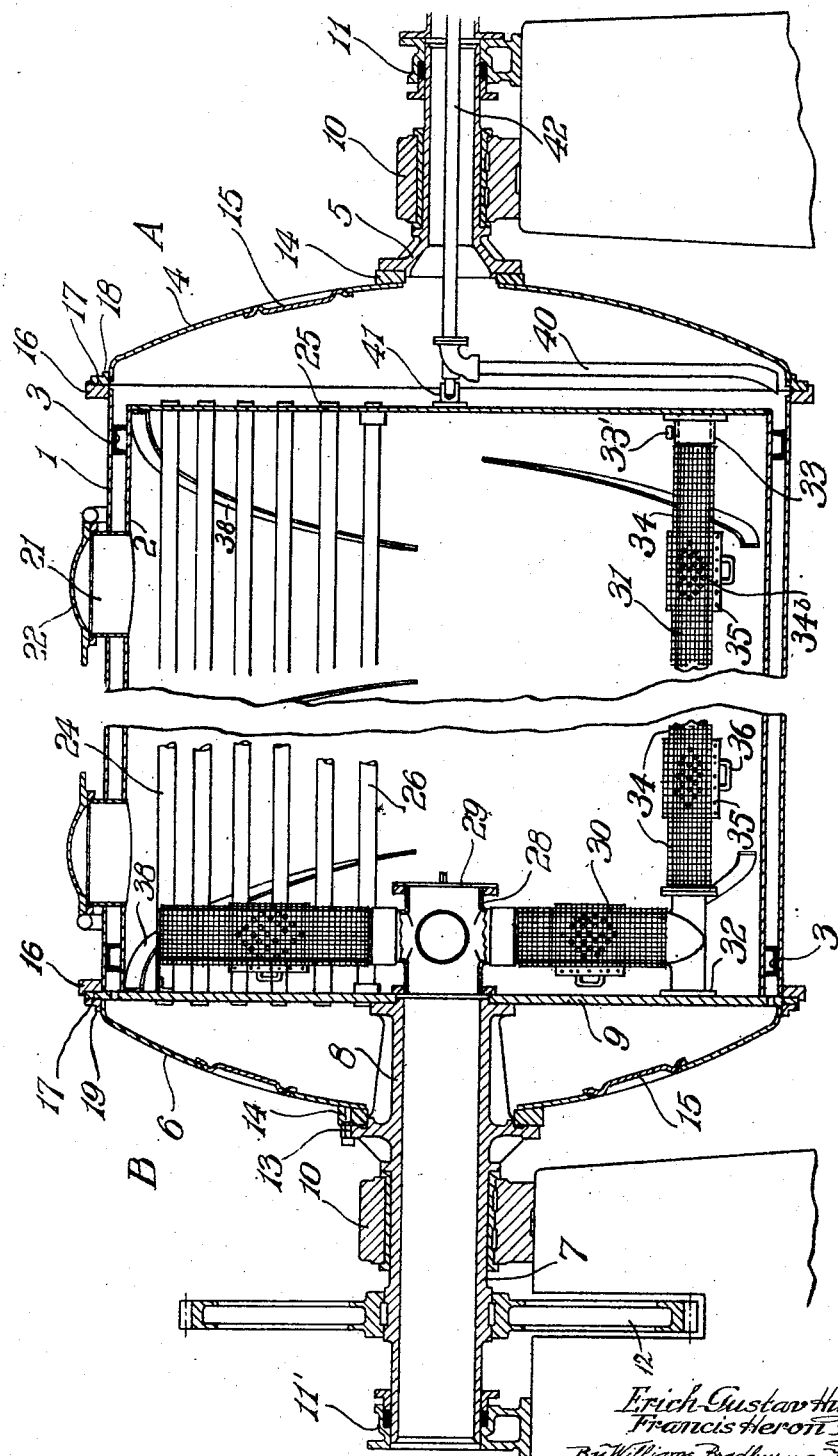
Fig. 1 is a part cross sectional side elevation of the invention.
Figure 2:
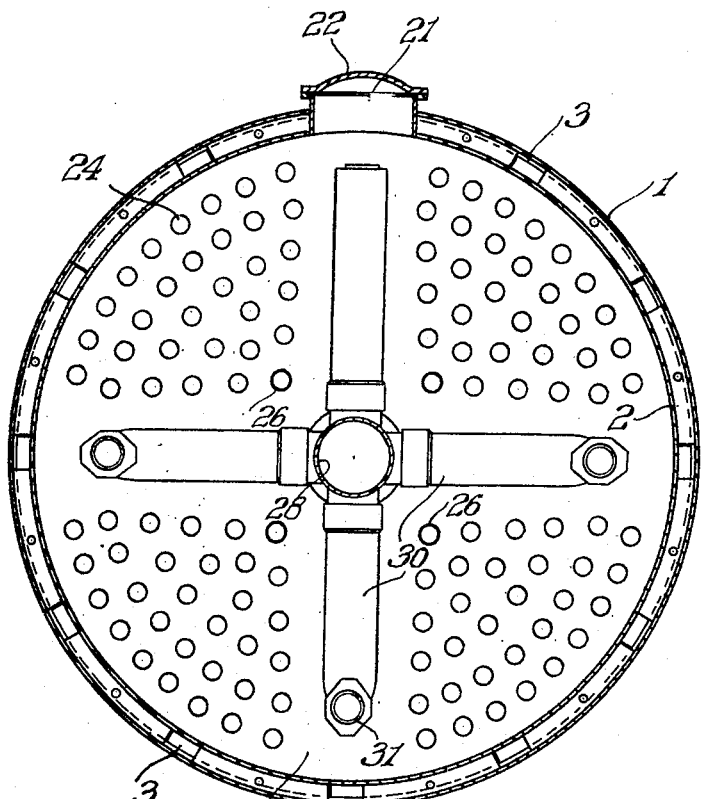
Fig. 2 is a cross sectional end elevation of Fig. 1.

Referring to the drawings and to Fig. 1 the drying device consists of an outer cylindrical shell 1, and an inner cylindrical shell 2. In their axial length these shells 1 and 2 are distanced apart by perforate distance piece rings 3. The outer shell 1 has a cover at either end. The steam admission side A has a cover 4, which is fast to a hollow trunnion 5, the vacuum side B being fitted with a cover 6, said cover being fast with trunnion 7, the latter having an extension 8, which latter is concentrically bolted to the tube plate 9 of the inner shell 2. Each of the hollow trunnions have external journals 10 and a terminal gland stuffing box indicated at 11 and 11', said journals and stuffing boxes being mounted upon pedestals. The dryer is rotated in any convenient manner, such for instance as by spur wheel 12 fast on trunnion 7. The spur wheel 12 is driven by a suitable prime mover (not shown) capable of speed control and reversal of direction of drive. The driving troque is transmitted by a multiple series of collar studs 13 screwed into pad rings 14 fast welded to cylinder end covers 4 and 6. Both end covers have inspection manholes 15. To avoid rocking during rotation the outer cylinder 1 is fitted with tooled rings 16 which engage in their recesses 17 at the steam end A with a like tooled ring 18. At the vacuum end B the ring 16 is recessed at 17 and the tube plate 9 is turned to fit the said recess. At this end the cover 6 is fitted with a face turned flange ring 19, and the said engaging rings are bolted together. Circular filling and emptying hatches 21 closed by dismountable covers 22 enter the inner cylinder and are made steam tight by welding about their entrance to the inner shell and exit of the outer cylinder shell. Steam tubes 24 pass in axial alignment from the main tube plate 9 to the back tube plate 25, see Fig. 2. The tubes 24 are concentrically arranged relative to the cylindrical shell 2 so as to form generally segmental shaped groups separated from each other as shewn in Fig. 2. Stay tubes or spacers are provided as shewn at 26 for reinforcing and rigidifying the entire structure. The steam heating tubular arrangement as shewn in Fig. 2 provides a cruciform opening in cross section. Within such opening is disposed centrally the vapour header 28 closed to the interior of the inner shell by a manhole cover 29. Radiating from said header 28 are four vapour tubes 30 in direct internal communication with axial perforate sheet metal vapour pipes 31. The axial pipes 31 are carried by a flange plate 32 on the tube header plate 9 and at the end remote thereof on a flanged socket 33. The pipes 31 enter the sockets and being cut short of abutting length are free to breathe under expansion and contraction slots in the ends of the pipes 31, and set screws 33' in the sockets 33 eliminate any tendency of the pipes 31 to twist or partially rotate.

It will be observed that the vapour pipes 31 are held well away from the walls of the inner cylinder 2, allowing clearance for grain whilst drying to encircle the said pipes during their rotation with the drying cylinders.

Figures 3, 4:
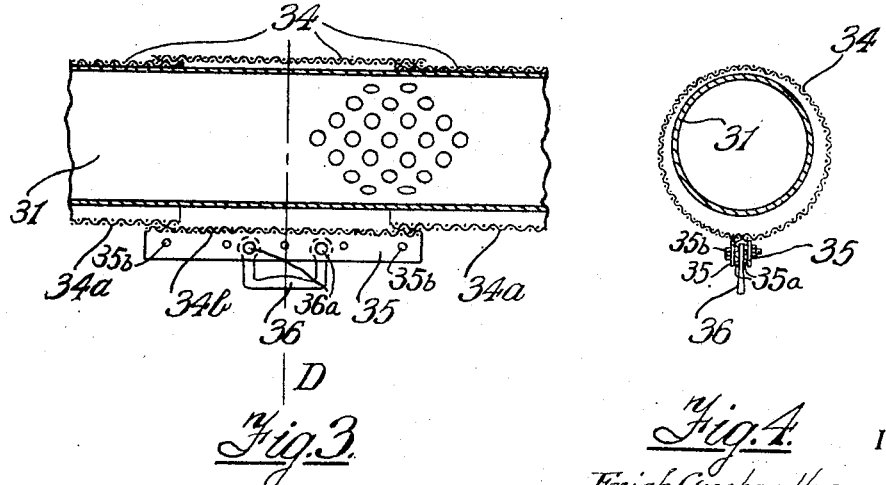
Fig. 3 is a longitudinal cross section of vapour extraction pipe showing a preferred form of gauze or mesh covering.
Fig. 4 is a cross section of Fig. 3 on line D—D.

In order to prevent entrance of grain to the vapour extraction pipes 31, reference is made to Figs. 3 and 4 wherein detail of the preferred arrangement is shewn and wherein the said pipes are formed from perforate sheets, butt welded and covered with wire gauze 34 of appropriate mesh to prevent grain entry to the perforate pipe. This gauze covering 34 may be in a continuous length but is better if made of larger diameter than the vapour pipe 31. Further, these gauze coverings may be made in short lengths, detachably secured to each other, each alternate length of telescopic dimensions with its adjoining gauze tubular lengths. In either form the mesh coverings should preferably be of larger diameter than the pipes 31. Thus length 34a is of lesser diameter than length 34b. The reason for this is to facilitate quick cleaning of enmeshed grain by sliding or grating one length telescopically over the other. In all cereals whatever the standard average grain size may be, there is ever present the likelihood of unripened or withered grain, or grain badly grown on poor soil producing a product having grains below standard size, that will half enter the mesh and block vapour access. Most of such grains are eliminated from their temporary retention by the scrubbing action of the grain on rotation of the cylinder and the movement of the loose meshings. Some, however, will remain, and in course of time must be cleared. Towards this end the intermediate length of gauze cylinders 34b has its opposite ends turned radially outwardly as indicated at 35a (Fig. 4). These ends are soldered or otherwise attached to a pair of plates 35 which may be drawn or clamped together by any suitable means such as a plurality of bolts 35b passing through aligned apertures in the plates. The bolts have a head on one end engaging one plate and a nut adapted to be threaded on the other end for drawing the plates together and thus constricting the larger gauze cylinder 34b upon the smaller cylinders 34a. When the nuts on these bolts are loosened, the inherent resilience of the wire mesh cylinders will cause the ends to spring out so that the cylinder 34 enlarges in diameter sufficiently so that it can be telescoped over cylinders 34a. To facilitate manipulation of the cylinder 34b when the cylinders are to be cleaned of grain, a handle 36 is provided secured to one of the plates 35 by any suitable means such as rivets or bolts 36a. The radial vapour pipes 30 are also perforate and wire gauze covered. To progress the grain within the body of the dryer the internal shell may be provided with helical inwardly protruding concentric rings 38.

In order to extract the condensate from the interior of the steam jacket of the drying vessel 1, stationary hollow tube 40 takes a bearing in the pedestal 41, passes through the steam trunnion 5 and emerges from the gland stuffing box 11, where it is piped away to a steam trap, not shewn.

Due to the pressure of steam existing in the heating jacket the condensate is forced up the dependent leg 40, enters the concentric condensate pipe 42, and the water so collected is passed out of the drier.

The operation of the invention is as follows:

The wet grain, either residual in the drier from a previous steam treatment, or placed therein through the openings 21, is filled into the interior until approximately one half to three quarters of the available space is occupied. The covers 22 are then replaced, steam is admitted to the drying machine jacket and cross tubes and the dryer revolved upon its trunnions 5 and 7. This brings the grain into intimate contact with the heated cross tubes 24 and shell jacket 2, and both temperature and pressure within the dryer will tend to rise. The interior of the dryer is then subjected to vacuum by opening a valve, not shewn, to a vacuum pump with interposed condenser or to a wet vacuum pump using the large diameter trunnion as a conduit for the vapours to a condenser and/or pump. When evacuation commences a large volume of water vapour is given off and it is essential that such vapour be removed as quickly as possible. To that end the inlet area of the perforate vapour pipes exceeds that of the header, a working ratio being five to one. Testing cocks of known type are provided to make moisture tests of the contents from time to time. When the contents of the device are sufficiently dry the machine is rotated until the covers 22 are at their lowermost position when they are opened and the contents exit to a conveyor for removal to storage bins or the mill. It is to be noted from the drawings that almost every interior part of the dryer contacting grain is accessible for cleaning and repair. To completely empty the dryer the covers 22 are removed and the vessel rotated in one direction or the other, the helical vanes 38 sweeping the contents to the exits 21. Alternatively telescopically handled pull rakes may be inserted to clear the shell of grain.

We claim:

1. A drying apparatus for cereal grain comprising in combination a rotatable cylindrical drying vessel having closed ends, tube plates adjacent the ends of said vessel defining headers therein at each end of the vessel, an inlet to one of said headers for supplying a vaporized heating fluid thereto, a plurality of heating tubes connecting said headers, said tubes being arranged in groups spaced from each other, a closed vapor extraction header axially disposed with respect to said vessel, perforated suction pipes extending longitudinally of said vessel in the space between said groups of heating tubes, said suction pipes being spaced inwardly of the walls of said vessel, radially extending perforated tubes connecting said vapor extraction header and said suction pipes, said tubes being located inwardly of the tube plates of said vessel, and tubular screening members surrounding said perforated suction pipes and tubes to prevent the entrance of grain or the like into the same, said screening members being of larger diameter than said pipes and loosely disposed about the same.

2. A drying apparatus for cereal grain comprising in combination a rotatable cylindrical drying vessel having closed ends, tube plates adjacent the ends of said vessel defining headers therein at each end of the vessel, an inlet to one of said headers for supplying a vaporized heating fluid thereto, a plurality of heating tubes connecting said headers, said tubes being arranged in groups spaced from each other, a closed vapor extraction header axially disposed with respect to said vessel, perforated suction pipes extending longitudinally of said vessel in the space between said groups of heating tubes, said suction pipes being spaced inwardly of the walls of said vessel, radially extending perforated tubes connecting said vapor extraction header and said suction pipes, said tubes being located inwardly of the tube plates of said vessel, and tubular screening members surrounding said suction pipes to prevent the entrance of grain or the like into said pipes, said screening members comprising spaced sections of tubular wire mesh of larger diameter than said suction pipes loosely surrounding the same and sections of larger diameter alternating with said first mentioned sections and overlapping the ends of the same, and releasable means for constricting said sections of larger diameter to bind said first and second sections together.

3. A drying apparatus for cereal grain comprising in combination a rotatable cylindrical drying vessel having closed ends, tube plates adjacent the ends of said vessel defining headers therein at each end of the vessel, an inlet to one of said headers for supplying a vaporized heating fluid thereto, a plurality of heating tubes connecting said headers, said tubes being arranged in groups spaced from each other, a closed vapor extraction header axially disposed with respect to said vessel, perforated suction pipes extending longitudinally of said vessel in the space between said groups of heating tubes, said suction pipes being spaced inwardly of the walls of said vessel, radially extending perforated tubes connecting said vapor extraction header and said suction pipes, said tubes being located inwardly of the tube plates of said vessel, and tubular screening members surrounding said suction pipes to prevent the entrance of grain or the like into said pipes, said screening members comprising spaced sections of tubular wire mesh of larger diameter than said suction pipes loosely surrounding the same and sections of larger diameter alternating with said first mentioned sections and overlapping the ends of the same, releasable means for constricting said sections of larger diameter to bind said first and second sections together, and means for manipulating said sections of larger diameter to move the same telescopically with respect to the first mentioned section when released from binding engagement with the same for clearing said sections of entrained grain.

4. A drying apparatus for cereal grain comprising in combination a rotatable cylindrical drying vessel having closed ends, tube plates adjacent the ends of said vessel defining headers therein at each end of the vessel, an inlet to one of said headers for supplying a vaporized heating fluid thereto, a plurality of heating tubes connecting said headers, said tubes being arranged in groups spaced from each other, a closed vapor extraction header axially disposed with respect to said vessel, perforated suction pipes extending longitudinally of said vessel in the spaces between said groups of heating tubes, means for establishing communication between said suction pipes and vapor extraction header, and means on said tube plates for supporting said pipes spaced inwardly of the walls of said vessel, said means including sockets supporting the ends of said pipes for longitudinal movement to permit thermal expansion and contraction of the same.

5. A drying apparatus for cereal grain comprising in combination a rotatable cylindrical drying vessel having spaced outer and inner jackets, hollow supporting trunnions for said vessel, one of said trunnions forming an inlet for heating fluid and the other of said trunnions providing an outlet for exhausting said vessel, tube plates adjacent the ends of said vessel defining headers therein at each end of the vessel, one of said headers communicating with said inlet trunnion, a plurality of heating tubes connecting said headers, said tubes being arranged in groups spaced from each other, suction pipes extending longitudinally of said vessel in the spaces between said groups of heating tubes spaced inwardly of the inner jacket of said vessel, said tubes communicating with the trunnion forming the exhaust outlet, a fixed condensate discharge pipe having an inlet adjacent the periphery of said vessel, a stationary discharge pipe extending axially of said inlet trunnion and communicating with said condensate pipe inlet, and fixed and rotatable supporting means on said pipe and inlet header for fixedly supporting said condensate discharge pipe from said header.

ERICH GUSTAV HUZENLAUB.
FRANCIS HERON ROGERS.

REFERENCES CITED

The following references are of record in the file of this patent:

UNITED STATES PATENTS

| Number | Name | Date |
|---|---|---|
| 513,896 | Dobson | Jan. 30, 1894 |
| 643,965 | Knuttel | Feb. 20, 1900 |
| 786,079 | Wells | Mar. 28, 1905 |
| 2,034,860 | Dalin | Mar. 24, 1936 |
| 2,268,486 | Huzenlaub | Dec. 30, 1941 |

FOREIGN PATENTS

| Number | Country | Date |
|---|---|---|
| 431 | Great Britain | 1890 |
| 414,724 | Germany | Aug. 24, 1921 |